United States Patent
Lee et al.

(10) Patent No.: US 11,309,558 B2
(45) Date of Patent: Apr. 19, 2022

(54) CONTROL METHOD AND SYSTEM FOR DRIVING OF MOTOR AND CONTROL METHOD OF DRIVING OF AIR COMPRESSOR OF FUEL CELL SYSTEM USING THE SAME

(71) Applicants: HYUNDAI MOTOR COMPANY, Seoul (KR); KIA MOTORS CORPORATION, Seoul (KR)

(72) Inventors: Dong Hun Lee, Anyang-si (KR); Keun Bong Ham, Yongin-si (KR); Chang Seok You, Anyang-si (KR); Min Su Kang, Paju-si (KR); Sung Do Kim, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 460 days.

(21) Appl. No.: 15/796,198

(22) Filed: Oct. 27, 2017

(65) Prior Publication Data
US 2018/0331378 A1 Nov. 15, 2018

(30) Foreign Application Priority Data

May 10, 2017 (KR) .......................... 10-2017-0057857

(51) Int. Cl.
*H02P 29/50* (2016.01)
*H02P 9/30* (2006.01)
*H01M 8/04313* (2016.01)
*B60L 58/33* (2019.01)
*H01M 8/04082* (2016.01)

(52) U.S. Cl.
CPC ......... *H01M 8/04313* (2013.01); *B60L 58/33* (2019.02); *H01M 8/04201* (2013.01); *H01M 2250/20* (2013.01)

(58) Field of Classification Search
CPC .................................. H02P 21/22; H02P 23/08
See application file for complete search history.

(56) References Cited

U.S. PATENT DOCUMENTS

| | | | |
|---|---|---|---|
| 2003/0020429 A1* | 1/2003 | Masaki ..................... | H02P 6/18 318/727 |
| 2006/0006832 A1* | 1/2006 | Kitajima .................. | B60K 6/26 318/800 |
| 2012/0268046 A1* | 10/2012 | Yamazaki .............. | H02P 21/26 318/400.02 |

FOREIGN PATENT DOCUMENTS

| | | |
|---|---|---|
| JP | 2010-221856 A | 10/2010 |
| JP | 2012-228083 A | 11/2012 |
| JP | 5806633 B2 | 11/2015 |

(Continued)

OTHER PUBLICATIONS

Korean Office Action dated Jun. 1, 2021 issued in Korean Patent Application No. 10-2017-0057857.

*Primary Examiner* — Muhammad S Islam
*Assistant Examiner* — Charles S Laughlin
(74) *Attorney, Agent, or Firm* — Morgan, Lewis & Bockius LLP

(57) ABSTRACT

A control method and system for driving of a motor and a control method of driving of an air compressor of a fuel cell system using the same include calculating an electrical rotation frequency of a motor, calculating a driving torque frequency of the motor based on the calculated electrical rotation frequency of the motor, and controlling torque of the motor to be repeatedly turned on/off at the calculated driving torque frequency.

11 Claims, 2 Drawing Sheets

(56) References Cited

FOREIGN PATENT DOCUMENTS

| JP | 2016-103940 A | 6/2016 |
|---|---|---|
| KR | 10-2015-0026265 A | 3/2015 |

* cited by examiner

3 TIME POINT OF 3-PHASE CURRENT 0 (A)

CONTROL METHOD AND SYSTEM FOR DRIVING OF MOTOR AND CONTROL METHOD OF DRIVING OF AIR COMPRESSOR OF FUEL CELL SYSTEM USING THE SAME

CROSS-REFERENCE TO RELATED APPLICATION

The present application is based on and claims the benefit of priority to Korean Patent Application No. 10-2017-0057857, filed on May 10, 2017, with the Korean Intellectual Property Office, the disclosure of which is incorporated herein by reference.

TECHNICAL FIELD

The present disclosure relates to a control method and system for driving of a motor and a control method of driving of an air compressor of a fuel cell system using the same, and more particularly, a control method and system for driving of a motor, for reducing electromagnetic noise generated during on/off control of a motor and increasing energy efficiency.

BACKGROUND

When a fuel cell vehicle is driven in an operating condition which degrades cooling performance during operation of a fuel cell stack with high output, for example, when the vehicle is driven uphill at high temperature, an operating temperature of the fuel cell stack increases, lowering humidity of supplied fuel and, accordingly, the fuel cell stack dries out, which drops a stack operating voltage with the same current. This results in a feedback loop in which a fuel cell operating temperature is further increased as a heat amount of the fuel cell stack is increased due to drop in stack voltage.

Recently, in order to prevent this phenomenon, control technology for increasing a pressure of air supplied to an air electrode (cathode) to increase relative humidity at the air electrode has been applied to a fuel cell system for vehicles. Accordingly, there is a need to further increase a compression ratio of an air compressor for supplying air to the air electrode of the fuel cell stack.

Since a compression ratio of air supplied toward the air electrode of the fuel cell stack needs to be further increased, an air compressor is designed to achieve a maximum efficiency at a maximum pressure operating point while further increasing a compression ratio of the air compressor. According to design, the efficiency of a compressor is increased in a range of a high flow rate and a high compression ratio but is degraded in a period corresponding to a relatively low flow rate. Accordingly, power consumption of an air compressor is increased in a range of a low flow rate, which is a main driving range during vehicle driving in a downtown area, and accordingly, this adversely affects vehicle fuel efficiency.

More specifically, a pressurized air compressor with a further increased air compression ratio compared with a conventionally used atmospheric air blower needs to be configured to further expand driving speed of a motor installed in the pressurized air compressor and, accordingly, a motor driving speed difference between a low flow rate range and a high flow rate range is increased, which disadvantageously affects enhancement in efficiency of the air compressor. That is, the pressurized air compressor is configured in such a way that motor inductance is reduced in order to ensure a sufficient voltage margin in a high-speed driving region along with increase in motor rotational speed and 3-phase ripple current is increased due to reduction in motor inductance, thereby degrading efficiency of a motor/inverter. In particular, in a low flow rate range that requires relatively low output, 3-phase current is low and efficiency is remarkably reduced due to increase in current ripple. That is, 3-phase ripple current, which is a secondary component, is not involved in motor torque and a 3-phase ripple current amount is relatively high compared with a 3-phase sine wave current component in a range of a low flow rate with low motor torque and, accordingly, efficiency of a motor/inverter is degraded compared with a high output range.

In addition, an airfoil bearing is applied to rotation of a motor of an air compressor for high-speed rotation and, in this regard, requires rotation at predetermined speed or more in order to maintain a lift state. Accordingly, there is a problem in that the airfoil bearing is damaged due to friction with a motor rotation axis when a motor is continuously driven at speed equal to or less than reference speed required to maintain the airfoil bearing in the lift state. Accordingly, in order to prevent the airfoil bearing from being damaged, the air compressor has a limitation in minimum driving speed and, thus, the air compressor is driven at the minimum driving speed or more, unnecessarily supplying an excessive amount of air even in a fuel cell that needs to be driven at low output, thereby reducing overall efficiency of a fuel cell system.

To overcome this, on/off control of torque for driving a motor of an air compressor is repeatedly performed during a low-seed operating range of the air compressor so as to reduce power consumption of the air compressor. However, during on/off control of driving torque, current that has been continuously supplied is applied only for a short time period within which the driving torque is turned on and, accordingly, there is a problem in that electromagnetic noise is increased.

The matters disclosed in this section are merely for enhancement of understanding of the general background of the invention and should not be taken as an acknowledgment or any form of suggestion that the matters form the related art already known to a person skilled in the art.

SUMMARY

Therefore, the present disclosure has been made in view of the above problems, and it is an object of the present disclosure to provide a control method and system for driving of a motor and a control method of driving of an air compressor of a fuel cell using the same, for reducing electromagnetic noise during on/off control of driving torque and remarkably enhancing efficiency of a motor in order to drive a motor, designed for maximum efficiency during high-speed rotation, at low speed.

In accordance with an aspect of the present disclosure, the above and other objects can be accomplished by the provision of a motor driving control method, including calculating an electrical rotation frequency of a motor, calculating a driving torque frequency of the motor based on the calculated electrical rotation frequency of the motor, and controlling torque of the motor to be repeatedly turned on/off at the calculated driving torque frequency.

The controlling of the torque of the motor may include applying driving current supplied to the motor when the torque of the motor is in an on-state and performing control to substantially adjust driving current supplied to the motor to 0 when the torque of the motor is in an off-state.

The controlling of the torque of the motor may include off controlling a switching device included in an inverter for applying driving current to the motor when the torque of the motor is in an off-state.

The controlling of the torque of the motor may include controlling a switching device included in an inverter to be turned on/off such that a driving voltage applied to the motor is substantially the same as counter electromotive force of the motor.

The calculating of the driving torque frequency of the motor may include calculating the driving torque frequency in synchronization with the calculated motor electrical rotation frequency.

The method may further include, prior to the controlling of the torque of the motor, calculating phases of 3-phase current of the motor, and calculating a start point for application of driving torque of the motor based on the calculated phases of 3-phase current of the motor, wherein the controlling of the torque of the motor may include applying the driving torque of the motor at the calculated start point for application of the driving torque.

The calculating of phases of 3-phase current motor may include calculating a start point at which any one of 3-phase current of the motor is 0 A.

The calculating of the start point for application of the driving torque may include calculating the start point for application of the driving torque of the motor such that the calculated start point at which any one of 3-phase current of the motor is 0 A is the center of a time period within which driving torque is on.

The calculating of the driving torque frequency of the motor may include calculating the driving torque frequency as a multiple of 6/n of the calculated electrical rotation frequency of the motor, where n is a natural number.

The calculating of the driving torque frequency of the motor may include calculating the driving torque frequency as a multiple of 6/n of the calculated electrical rotation frequency of the motor, where n is a natural number that is not a multiple of 3.

In accordance with another aspect of the present disclosure, the above and other objects can be accomplished by the provision of a motor driving control system including a motor monitoring device for monitoring rotation of a motor and calculate an electrical rotation frequency of the motor, a driving torque frequency calculating device for calculating a driving torque frequency for controlling driving torque of the motor to be repeatedly turned on/off based on the electrical rotation frequency calculated by the motor monitoring device, and an inverter controller for controlling the driving torque of the motor to be repeatedly turned on/off at the driving torque frequency of the motor, calculated by the driving torque frequency calculating device.

The motor driving control system may further include a driving torque application time calculating device for calculating phases of 3-phase current of the motor and calculate a start point for application of driving torque of the motor based on the calculated phases of 3-phase current of the motor, wherein the inverter controller applies the driving torque at the calculated start point for application of the driving torque.

In accordance with another aspect of the present disclosure, the above and other objects can be accomplished by the provision of a motor driving control method of an air compressor of a fuel cell system, for supplying compressed air to a fuel cell stack, the method including calculating an electrical rotation frequency of a motor, calculating a driving torque frequency of the motor based on the calculated electrical rotation frequency of the motor, and controlling torque of the motor to be repeatedly turned on/off at the calculated driving torque frequency.

The method may further include, prior to the controlling of the torque of the motor, calculating phases of 3-phase current of the motor, and calculating a start point for application of driving torque of the motor based on the calculated phases of 3-phase current of the motor, wherein the controlling of the torque of the motor may include applying the driving torque of the motor at the calculated start point for application of the driving torque.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Hereinafter, a light module for a vehicle according to exemplary embodiments of the present disclosure will be described with reference to the accompanying drawings.

Figure 1:
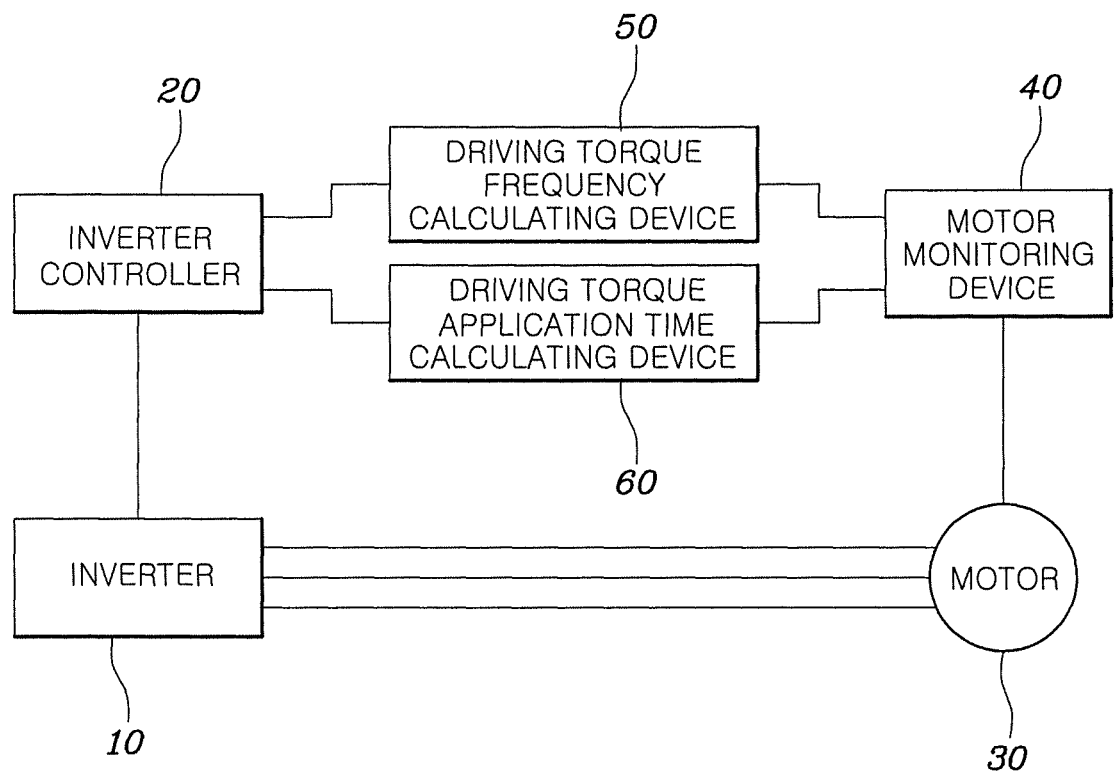
FIG. 1 is a diagram showing a configuration of a motor driving control system according to an exemplary embodiment of the present disclosure.
Figure 2:
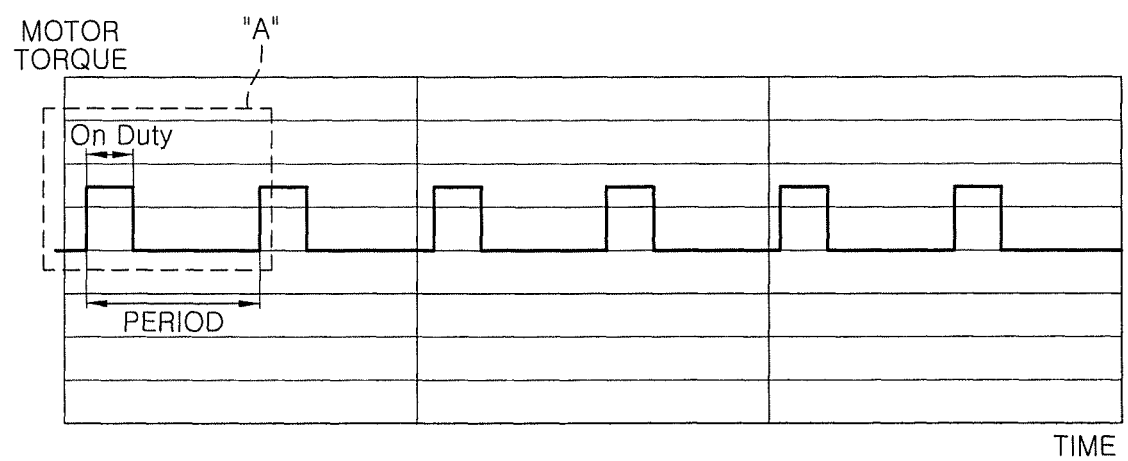
FIG. 2 is a graph showing on/off control of motor driving torque applied to a motor driving control method according to an exemplary embodiment of the present disclosure.
Figure 3:
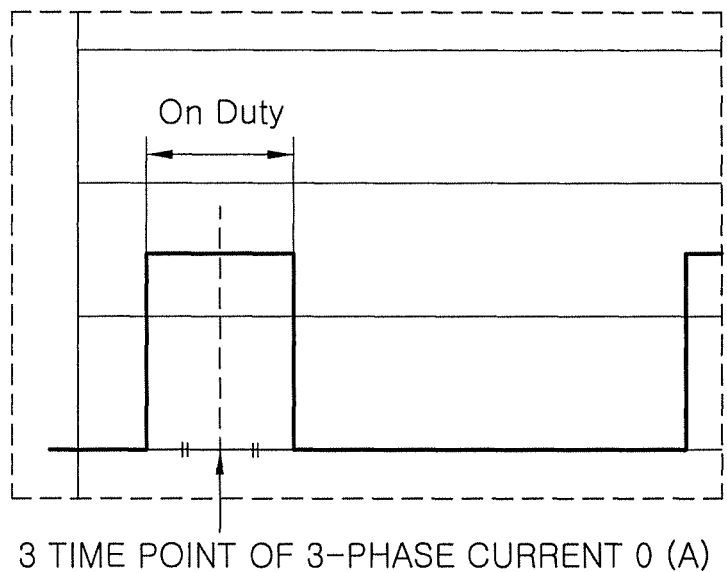
FIG. 3 shows a portion "A" of FIG. 2 and is a graph showing a start point for application of motor driving torque during on/off control of motor driving torque according to an exemplary embodiment of the present disclosure.
Figure 4:
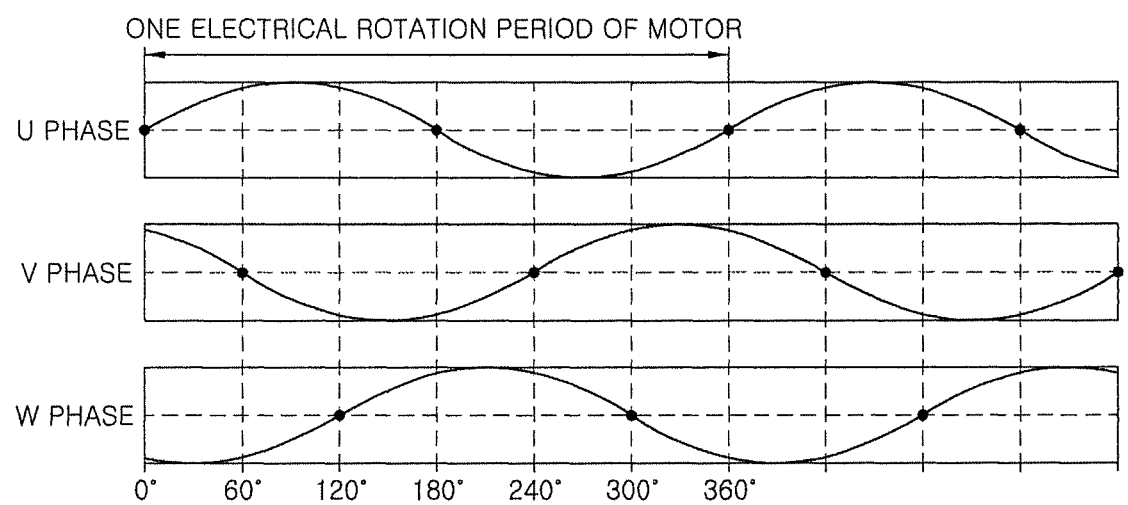
FIG. 4 is a graph showing a 3-phase current waveform of a motor when motor driving torque is continuously applied.

FIG. 1 is a diagram showing a configuration of a motor driving control system according to an exemplary embodiment of the present disclosure. FIG. 2 is a graph showing on/off control of motor driving torque applied to a motor driving control method according to an exemplary embodiment of the present disclosure. FIG. 3 is a graph showing a start point for application of motor driving torque during on/off control of motor driving torque according to an exemplary embodiment of the present disclosure. FIG. 4 is a graph showing a 3-phase current waveform of a motor when motor driving torque is continuously applied.

As illustrated in FIG. 1, the motor driving control system according to the present disclosure may include a motor monitoring device 40 for monitoring rotation of a motor 30 and calculating an electrical rotation frequency of the motor 30, a driving torque frequency calculating device 50 for calculating a frequency at which driving torque of the motor 30 is controlled to be repeatedly turned on/off based on the electrical rotation frequency calculated by the motor monitoring device 40, and an inverter controller 20 for controlling the driving torque of the motor 30 to be repeatedly turned on/off at the driving torque frequency of the motor 30, calculated by the driving torque frequency calculating device 50.

Referring to FIG. 1, the motor driving control method according to the present disclosure may include calculating an electrical rotation frequency of the motor 30 by the motor monitoring device 40, calculating a driving torque frequency of the motor 30 based on the calculated electrical rotation frequency of the motor 30 by the driving torque frequency calculating device 50, and controlling driving torque of the motor 30 to be turned on/off at the calculated driving torque frequency by the inverter controller 20.

Here, electrical rotation of the motor 30 refers to one period of 3-phase current applied to the motor 30 by an inverter 10, but not one physical rotation of the motor 30. Accordingly, the electrical rotation frequency may be a multiple of a physical rotation frequency of the motor 30 depending on the number of magnets included in the motor 30.

In the calculating of the electrical rotation frequency of the motor 30 by the motor monitoring device 40, electrical rotation of the motor 30 may be sensed by a sensor. For example, electrical rotation of the motor 30 may be sensed over time by a Hall sensor so as to calculate the electrical rotation frequency.

In the calculating of the driving torque frequency of the motor 30 based on the calculated electrical rotation frequency of the motor 30, a frequency at which driving torque of the motor 30 is controlled to be repeatedly turned on/off based on the calculated electrical rotation frequency of the motor 30 may be determined.

As shown in FIG. 2, driving torque of the motor 30 may be repeatedly turned on/off with a preset constant period and duty. The controlling of driving torque of the motor 30 to be turned on/off at the driving torque frequency calculated by the inverter controller 20 may include control of repeatedly applying and shutting off torque to the motor 30 at the calculated driving torque frequency.

The on/off controlling of torque of the motor 30 may be performed via control of repeatedly applying driving current supplied to the motor 30 when torque of the motor 30 is in an on-state and substantially adjusting driving current supplied to the motor 30 to 0 when torque of the motor 30 is in an off-state.

An example of a scheme of on/off controlling of torque of the motor 30 may include a method of determining all switching devices (not shown) included in the inverter 10 to be in an off-state (off duty of 100%) and shutting off driving current supplied to the motor 30 in a range within which torque of the motor 30 is set to be off. That is, a driving signal for controlling a switching device (not shown) of the inverter 10 using a general method applied to drive the motor 30 may be output to the inverter 10 in a range within which torque of the motor 30 needs to be maintained to be in an on-state, and a control signal for turning off all switching devices (not shown) may be output to the inverter 10 in a range within which torque of the motor 30 needs to be maintained to be in an off-state.

In the motor driving control method, on/off control of torque according to an exemplary embodiment of the present disclosure may include controlling driving torque of the motor 30 to be turned on/off with a predetermined period and duty and, in this regard, on/off control of torque may be achieved by generally controlling an inverter switching device (not shown) in a range within which torque is set to be on and turning off all inverter switching devices (not shown) in a range within which torque is set to be off.

Another method of controlling a switching device (not shown) of the inverter 10 in a range within which torque is set to be off may be a method of controlling a switching device (not shown) of each phase to be turned on/off in an inverter so as to generate a driving voltage with substantially the same voltage amplitude as counter electromotive force generated by the motor 30. When the counter electromotive force of the motor 30 is the same as a 3-phase driving voltage of an inverter, a potential difference is not generated and, thus, a current state may become a zero-current state in which current is not supplied to the motor 30 from an inverter.

In the calculating of the driving torque frequency by the driving torque frequency calculating device 50, the driving torque frequency may be calculated in synchronization with the calculated motor electrical rotation frequency. Here, synchronization may refer to equalization and may also refer to a predetermined relationship in which the motor electrical rotation frequency is a multiple of the driving torque frequency or conversely, the driving torque frequency is a multiple of the motor electrical rotation frequency.

When the driving torque frequency of the motor 30 is synchronized with the electrical rotation frequency of the motor 30, the same 3-phase current is generated for a time period (on duty) in which driving torque is on. Accordingly, an electromagnetic noise source generated for a time period within which driving torque is on becomes constant, electromagnetic noise may be reduced compared with a conventional case in which electromagnetic noise in various frequency bands is generated.

The motor driving control method may further include, prior to the on/off controlling of driving torque of the motor 30, calculating phases of 3-phase current of the motor 30 by the motor monitoring device 40, and calculating a start point for application of driving torque of the motor 30 based on the calculated phases of the 3-phase current of the motor 30 by a driving torque application time calculating device 60. In the controlling of the driving torque of the motor 30, the inverter controller 20 may apply the driving torque of the motor 30 at the calculated start point for application of the driving torque.

In the calculating of the phases of the 3-phase current of the motor 30, the motor monitoring device 40 may calculate sine wave phases of current flowing in three phases of the motor 30. Actual current in three phases of the motor 30 is substantially applied only in a range within which driving torque is on and, thus, phases of 3-phase current cannot be recognized via actual measurement. Accordingly, the motor monitoring device 40 may monitor position information and so on of the motor 30 and calculate the sine wave phases of applied current flowing in three phases of the motor 30 in a range within which driving torque is on, based on the monitored information of the motor 30.

In the calculating of the start point for application of driving torque of the motor 30 based on the phases of the 3-phase current of the motor 30, calculated by the driving torque application time calculating device 60, a start point of repeatedly applying motor driving torque at the calculated driving torque frequency may be calculated.

In the calculating of the start point for application of driving torque of the motor 30, the driving torque application time calculating device 60 may calculate a start point at which any one of 3-phase current of the motor is 0 A based on the phases of the 3-phase current of the motor, calculated in the calculating of the phases of the 3-phase current of the motor. The start point for application of driving torque of the motor may be calculated based on the calculated start point at which any one of 3-phase current of the motor is 0 A.

In detail, in the calculating of the start point for application of driving torque, the driving torque application time calculating device 60 may calculate a start point for application of motor driving torque such that a start point at which any one of 3-phase current of the motor is 0 A is the center of a time period within which driving torque is on.

As illustrated in FIG. 4, when driving torque is continuously applied, a waveform of current flowing in three phases of the motor 30 is a sin waveform. Accordingly, when an electrical rotation period of the motor 30 is 360°, the current waveform is formed in such a way that one of three phases repeatedly becomes 0 A at an interval of 180° and a difference of 120° is present between two of the three phases.

For example, the motor monitoring device 40 may monitor position information and so on of the motor 30 using a Hall sensor or the like and calculate a sine wave phase of current flowing in three phases of the motor 30 in a range within which driving torque is on, based on the monitored information of the motor 30. A start point at which current in any one of the calculated three phases is 0 A may be synchronized with a start point for application of driving torque of the motor 30.

In particular, as shown in FIG. 3, which shows a portion "A" of FIG. 2, when a start point at which any one of the calculated three phases is 0 A is synchronized with a start point for application of driving torque of the motor 30, the start point for application of driving torque of the motor 30 may be calculated such that a start point at which any one of 3-phase current of the motor is 0 A is the center of a time period within which driving torque is on (on duty). Thereby, current is barely generated in one phase synchronized with a start point at which current is 0 A for a time period within which driving torque is on after and before a start point at which any one of 3-phase current is 0 A and, thus, electromagnetic noise is barely generated, thereby minimizing electromagnetic noise. In addition, electromagnetic waves generated in the remaining two phases that are not synchronized with a start point at which 3-phase current is 0 A are symmetrical to each other and, thus, electromagnetic noise may be reduced according to an interference effect.

When the same torque is generated, vector sum of current applied to three phases of the motor is constant but the sum of amplitudes of current applied in three phases, for determining power loss of the inverter 10, may be changed every start point. The sum of amplitudes of current applied in three phases is lowest at a start point at which any one of 3-phase current is 0 A and, thus, when a start point at which any one of phase current is 0 A is synchronized with a start point for application of driving torque of the motor 30, power loss of the inverter 10 may be reduced, thereby enhancing efficiency.

According to an exemplary embodiment of the present disclosure, in the calculating of the driving torque frequency, the driving torque frequency may be calculated as a multiple of 6/n, where n is a natural number, of the calculated electrical rotation frequency of the motor 30, and, in this case, the driving torque frequency may be calculated.

In detail, referring to FIG. 4, when one period of the electrical rotation of the motor 30 is 360°, a point at which current in any one of three phases is 0 A is repeatedly generated at an interval of 60°. That is, when current in any one of three phases is 0 A at a point of 0°, any one of current in three phases is 0 A at a point such as 60°, 120°, 180°, 240°, 300°, and 360°.

Accordingly, when a period of driving torque is a multiple of n/6 such as multiples of 1/6, 2/6, and 3/6 of an electrical rotation period of the motor 30, i.e., a multiple of 6/n (n being a natural number) such as multiples of 6, 3, and 2 of the electrical rotation frequency of the motor 30, a point at which current in any one of phases is 0 A is repeatedly generated.

Thereby, a freedom degree for changing the driving torque frequency of the motor 30 may be increased compared with synchronization with the electrical rotation frequency of the motor 30 and, thus, various frequencies may be selected. Accordingly, a driving torque on/off frequency with higher efficiency may be selected depending on an operating condition.

According to another exemplary embodiment of the present disclosure, in the calculating of the driving torque frequency, the driving torque frequency may be calculated as a multiple of 6/n of the calculated electrical rotation frequency of the motor 30, and, in this case, the driving torque frequency may be calculated where n is a natural number that is not a multiple of 3.

In detail, referring to FIG. 4, when one period of the electrical rotation of the motor 30 is 360°, a point at which current in any one of three phases is 0 A is repeatedly generated at an interval of 60° but a point at which any one current is 0 A is repeatedly generated at an interval of 180°. When current in any one of three phases is 0 A at a point of 0°, phases with current of 0 A are uniformly distributed only if an interval is 60°, 120°, 240°, 300°, or the like.

Accordingly, when a period of driving torque is a multiple of n/6 such as multiples of 1/6, 2/6, 4/6, 5/6, and 7/6 of the electrical rotation period of the motor 30, i.e., a multiple of 6/n (n being a natural number that is not a multiple of 3) such as multiples of 6, 3, and 3/2 of the electrical rotation frequency of the motor 30, a point at which current in any one of three phases is 0 A is repeatedly generated and is uniformly distributed in three phases.

Thereby, one phase of three phases of the motor 30 with a start point at which current is 0 A synchronized with a start point for application of driving torque may be uniformly distributed, thereby preventing wires of the motor 30 or a 3-phase switching device (not shown) of an inverter from being fatigued or preventing eccentricity of the motor 30.

The invertor controller 20, the motor monitoring device 40, the driving torque frequency calculating device 50, and the driving torque application time calculating device 60 are implemented with a hardware processor to perform the functions described above.

As is apparent from the above description, when a control method and system for driving of a motor and a control method of driving of an air compressor of a fuel cell using the same are used, power consumption of a motor may be reduced to enhance efficiency of a system to which the motor is applied. In particular, in a fuel cell vehicle including an air compressor to which the motor is applied, power consumption of the air compressor may be reduced to enhance fuel cell system efficiency and vehicle fuel efficiency.

In particular, when a control method and system for driving of a motor and a control method of driving of an air compressor of a fuel cell using the same are used, electromagnetic noise may be reduced and switching and conducting power loss of the inverter 10 may be reduced, thereby reducing power consumption.

Although the preferred embodiments of the present disclosure have been described above with reference to the accompanying drawings, those skilled in the art will appreciate that the present disclosure can be implemented in various other embodiments without changing the technical ideas or features thereof.

What is claimed is:

1. A motor driving control method, the method comprising steps of:
   calculating an electrical rotation frequency of a motor;

calculating a driving torque frequency of the motor based on the calculated electrical rotation frequency of the motor;

calculating phases of 3-phase current of the motor;

calculating a start point for applying driving torque of the motor based on the calculated phases of 3-phase current of the motor; and controlling torque of the motor to be repeatedly turned on/off at the calculated driving torque frequency, wherein the step of calculating a driving torque frequency of the motor comprises calculating the driving torque frequency in synchronization with the calculated electrical rotation frequency of the motor, wherein the step of calculating a driving torque frequency of the motor further comprises determining the driving torque frequency as a multiple of 6/n of the calculated electrical rotation frequency of the motor, where n is a natural number, and wherein the step of calculating a start point for applying driving torque comprises calculating a start point at which any one of 3-phase current of the motor is 0 [A] based on the calculated phases of 3-phase current of the motor and applying the driving torque of the motor based on the calculated start point.

2. The motor according to claim 1, wherein the step of controlling torque of the motor comprises applying driving current supplied to the motor when the torque of the motor is in an on-state and performing control to substantially adjust the driving current supplied to the motor to 0 when the torque of the motor is in an off-state.

3. The motor according to claim 2, wherein the step of controlling torque of the motor further comprises controlling a switching device to be off included in an inverter for applying driving current to the motor when the torque of the motor is in an off-state.

4. The method according to claim 2, wherein the step of controlling torque of the motor further comprises controlling a switching device included in an inverter to be turned on/off such that a driving voltage applied to the motor is substantially the same as counter electromotive force of the motor.

5. The method according to claim 1,
wherein the step of controlling torque of the motor comprises applying the driving torque of the motor at the calculated start point for applying the driving torque.

6. The method according to claim 5, wherein the step of calculating a start point for applying driving torque further comprises calculating the start point for applying the driving torque of the motor such that the calculated start point at which any one of the 3-phase current of the motor is 0 [A] is a center of a time period within which the driving torque is on.

7. The method according to claim 1, wherein the step of calculating a driving torque frequency of the motor further comprises determining the driving torque frequency as a multiple of 6/n of the calculated electrical rotation frequency of the motor, where n is a natural number that is not a multiple of 3.

8. A motor driving control system comprising a processor including:
a motor monitoring device configured to calculate an electrical rotation frequency of the motor;

a driving torque frequency calculating device configured to calculate a driving torque frequency for controlling driving torque of the motor to be repeatedly turned on/off based on the electrical rotation frequency calculated by the motor monitoring device; and an inverter controller configured to control the driving torque of the motor to be repeatedly turned on/off at the driving torque frequency of the motor, calculated by the driving torque frequency calculating device, wherein the driving torque frequency calculating device calculates the driving torque frequency in synchronization with the calculated electrical rotation frequency of the motor, wherein the driving torque frequency calculating device determines the driving torque frequency as a multiple of 6/n of the calculated electrical rotation frequency of the motor, where n is a natural number, wherein the processor further includes a driving torque application time calculating device configured to calculate phases of 3-phase current of the motor and calculate a start point at which any one of 3-phase current of the motor is 0 [A] based on the calculated phases of 3-phase current of the motor, and wherein the inverter controller applies the driving torque of the motor based on the calculated start point.

9. The motor driving control system according to claim 8,
wherein the inverter controller applies the driving torque at the calculated start point for applying the driving torque.

10. A motor driving control method of an air compressor of a fuel cell system, for supplying compressed air to a fuel cell stack, the method comprising steps of:
calculating an electrical rotation frequency of a motor;

calculating a driving torque frequency of the motor based on the calculated electrical rotation frequency of the motor;

calculating phases of 3-phase current of the motor;

calculating a start point for applying driving torque of the motor based on the calculated phases of 3-phase current of the motor; and controlling torque of the motor to be repeatedly turned on/off at the calculated driving torque frequency, wherein the step of calculating a driving torque frequency of the motor comprises calculating the driving torque frequency in synchronization with the calculated electrical rotation frequency of the motor, wherein the step of calculating a driving torque frequency of the motor further comprises determining the driving torque frequency as a multiple of 6/n of the calculated electrical rotation frequency of the motor, where n is a natural number, and wherein the step of calculating a start point for applying driving torque comprises calculating a start point at which any one of 3-phase current of the motor is 0 [A] based on the calculated phases of 3-phase current of the motor and applying the driving torque of the motor based on the calculated start point.

11. The method according to claim 10,
wherein the step of controlling torque of the motor comprises applying the driving torque of the motor at the calculated start point for applying of the driving torque.

* * * * *